(12) United States Patent
King

(10) Patent No.: US 7,993,527 B2
(45) Date of Patent: Aug. 9, 2011

(54) CONTROL SYSTEM

(76) Inventor: Joseph A. King, Wayzata, MN (US)

( * ) Notice: Subject to any disclaimer, the term of this patent is extended or adjusted under 35 U.S.C. 154(b) by 1257 days.

(21) Appl. No.: 11/648,743

(22) Filed: Dec. 29, 2006

(65) Prior Publication Data

US 2007/0158274 A1 Jul. 12, 2007

Related U.S. Application Data

(60) Provisional application No. 60/757,198, filed on Jan. 6, 2006.

(51) Int. Cl.
*C02F 1/00* (2006.01)
*G08B 21/00* (2006.01)

(52) U.S. Cl. ............... 210/739; 210/748.01; 210/167.3; 210/749; 210/96.1; 422/43; 422/28; 422/29

(58) Field of Classification Search ............ 210/178.01, 210/739, 186.1, 96.1; 422/22, 28, 29, 43
See application file for complete search history.

(56) References Cited

U.S. PATENT DOCUMENTS

| | | | | |
|---|---|---|---|---|
| 5,160,604 | A * | 11/1992 | Nakamura et al. | 204/403.06 |
| 5,422,014 | A * | 6/1995 | Allen et al. | 210/743 |
| 5,985,155 | A * | 11/1999 | Maitland | 210/739 |
| 6,471,858 | B1 * | 10/2002 | King | 210/192 |
| 6,627,053 | B2 * | 9/2003 | Hirota et al. | 204/228.1 |
| 2004/0154965 | A1 * | 8/2004 | Baum et al. | 210/85 |

* cited by examiner

*Primary Examiner* — Walter D Griffin
*Assistant Examiner* — Cameron J Allen
(74) *Attorney, Agent, or Firm* — Jacobson & Johnson LLC

(57) ABSTRACT

A system for on site monitoring and controlling the characteristics of a body of water by measuring the water characteristics in a first position and adjusting the water characteristics in a second position through either adding dispensable materials to the water or changing the energy of the water or both.

29 Claims, 3 Drawing Sheets

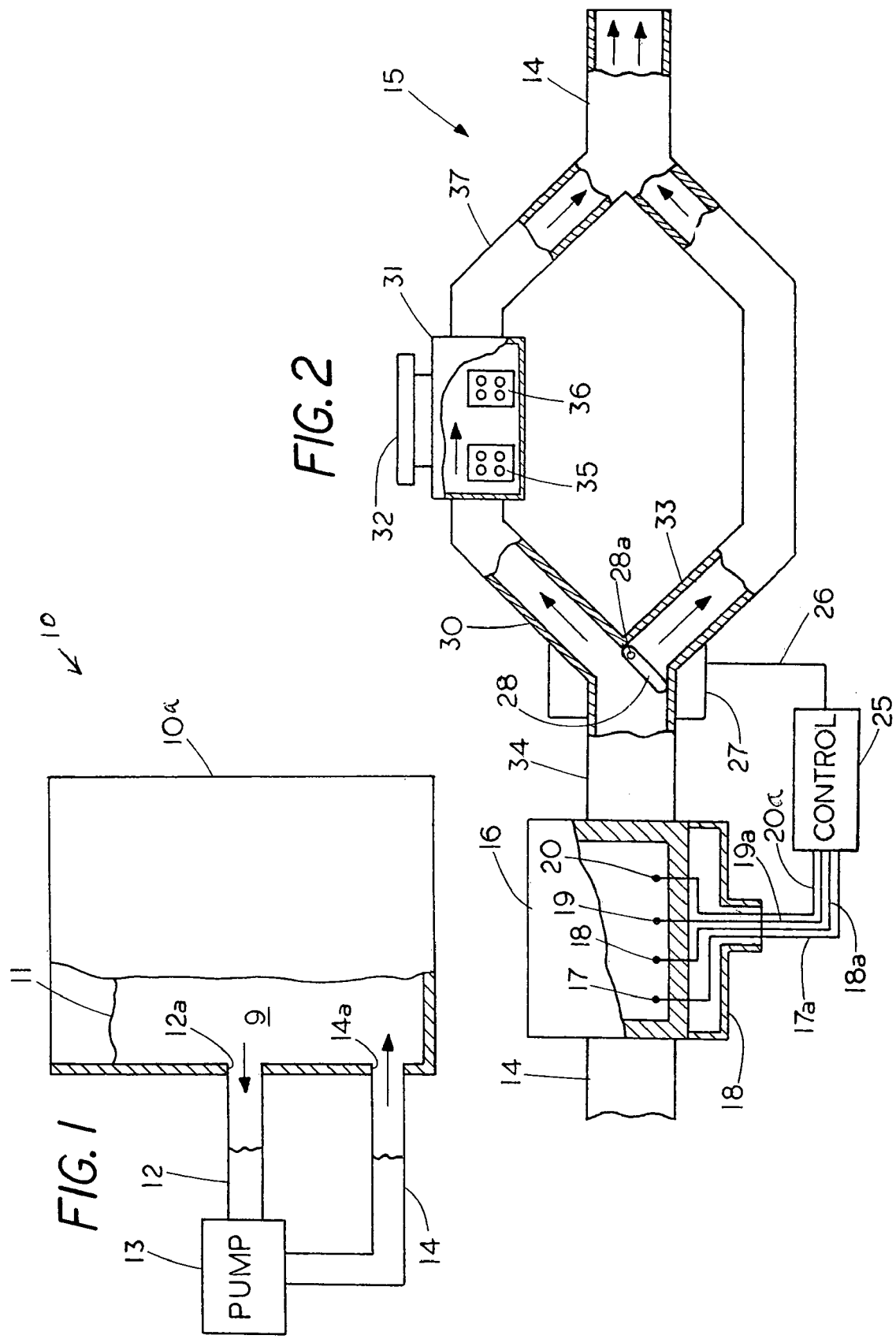

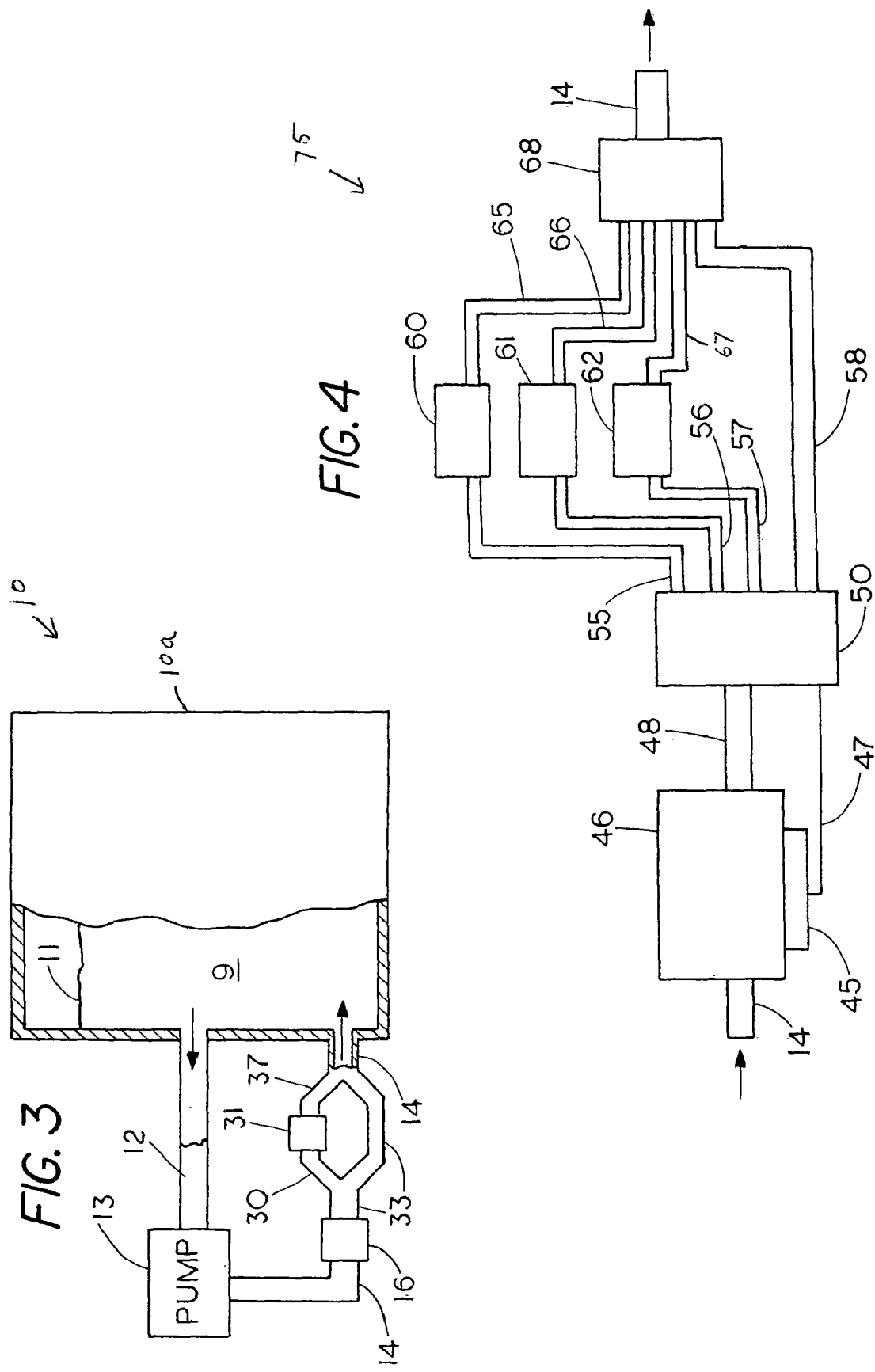

CONTROL SYSTEM

CROSS REFERENCE TO RELATED APPLICATIONS

This application claims priority from provisional patent application 60/757,198 titled Control Systems filed Jan. 6, 2006.

FIELD OF THE INVENTION

This invention relates generally to control systems and, more specifically, a control system to monitor and adjust the water characteristics of a body of water.

STATEMENT REGARDING FEDERALLY SPONSORED RESEARCH OR DEVELOPMENT

None

REFERENCE TO A MICROFICHE APPENDIX

None

BACKGROUND OF THE INVENTION

Contained bodies of water where a person immerses himself or herself partly or wholly in the body of water can be found in swimming pools, spas, hot tubs, jetted tubs as well other containers. Generally, the person immerses his or her body partially or wholly in the body of water in order to obtain the effects of the water. In order to make the body of water safe for body contact it is necessary to kill harmful microorganisms in the water such as bacteria which can be done by dispensing antibacterial materials into the water. These type of water characteristics can be referred to as water safety characteristics. In addition, from time to time other water characteristics of the body of water, such as water comfort characteristics are adjusted. For example, the water temperature may be changed or in some cases the pH of the water may be adjusted sometimes both for safety purposes and for the comfort of the water user.

In general, a pump circulates the water in a container so as to provide a body of water with uniform water characteristics as well as to remove unwanted materials or debris from the water. During the circulation of the water dispensable materials such as minerals or other ion yielding materials can be controllable dispensed into the water through either inline dispensers or floating dispensers to control the microorganisms in the water. Other water characteristics such as a water temperature can be controlled by a heating or cooling the water as it flows through a heat transfer unit. In either case the water characteristics whether safety or comfort characteristics can be changed to make the water suitable and safe for the user.

While water characteristics in the containers have been periodically monitored and controlled by adding dispensable material to the water a feature of the present invention is that the water characteristics, such as water comfort characteristics and water safety characteristics, can be monitored and controlled on-the-go. This allows the water characteristics to be maintained within close ranges which can make a users recreational experience in the water not only more comfortable but also insure that the water does not contain harmful organisms.

A further feature of the invention is an analog control system that can smoothly and continuously control the dispensing rates without having to turn the dispensers on or off.

A further feature of the invention is a control system that can shut off the flow through the system.

A further feature of the inventions is a control system that can be operated in either of two modes.

A further feature of the present invention is that it is well suited to use with small recreational water systems such as pools, spas, hot tubs or the like either as an after market item in those systems have an existing circulation system it can be introduced during the manufacture of the pools, spas, hot tubs or the like.

SUMMARY OF THE INVENTION

A system for on site monitoring and controlling the characteristics of a body of water by measuring the water characteristics in a first position and adjusting the water characteristics in a second position through either adding dispensable materials to the water or changing the energy of the water or both.

BRIEF DESCRIPTION OF THE DRAWINGS

FIG. 1 is a partial cutaway view of a container with a circulation pump;

FIG. 2 is a partial cutaway view of a control system that can provide on off flow or proportional flow through the dispensers;

FIG. 3 is a partial cutaway view of the control system of FIG. 2 spliced into the circulation system of FIG. 1;

FIG. 4 is an alternate embodiment of a control system that monitors and controls various comfort and safety characteristics of a body of water;

DESCRIPTION OF THE PREFERRED EMBODIMENT

Figure 5:
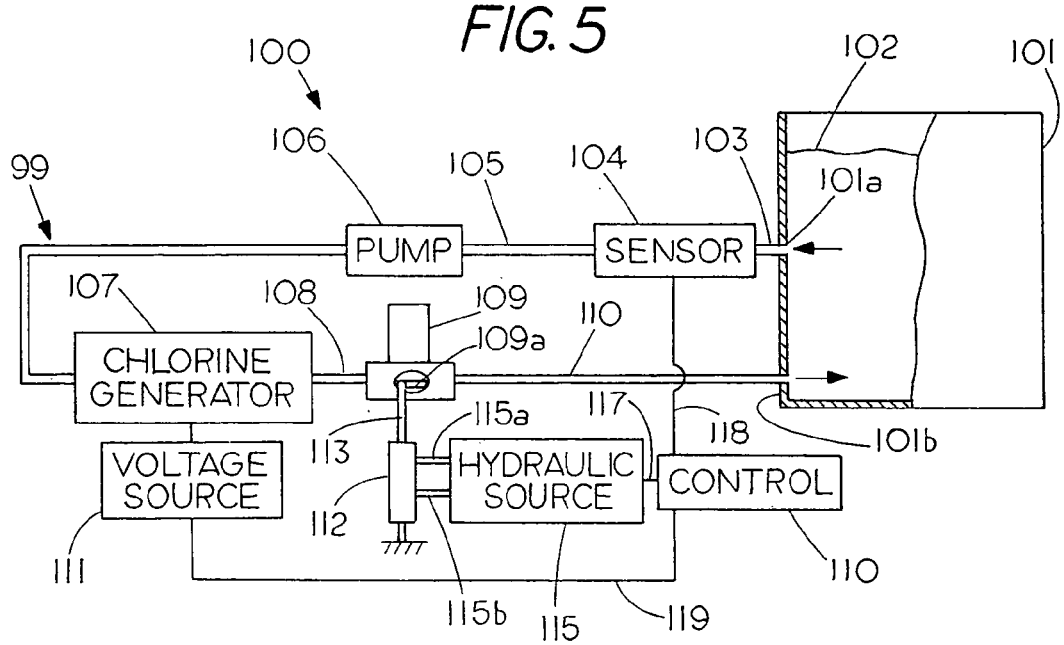
FIG. 5 shows a system for automated analog control of the dispensing materials for a body of water.

FIG. 1 shows a partial cutaway view of a system 10 with a container 10a having a water circulation system including a pump 13, an inlet 12a, an inlet line 12, an outlet line 14 and an outlet 14a that circulates fluid to and from container 10 to maintain the water in a user-friendly condition. A filter, not shown, removes any debris from the water during the circulation process. These types of system are particularly well suited for use with recreational waters that are found in swimming pools, spas, hot tubs or other types of jetted tubs which humans immerse themselves partially or wholly therein.

In order to provide not only a safe water environment but also a comfortable water environment a number of water comfort characteristics and/or water safety characteristics need to be maintained. For example, the safety of the water needs to be maintained by controlling the level of harmful microorganisms in the water. In addition, other water characteristics such as temperature, pH and salinity of the water should be maintained at the proper levels to provide a comfortable body environment. In some cases the water characteristics can be considered comfort characteristics and in other cases the water characteristics have a direct affect on the safety of the water. In addition, some of the water characteristics can affect other water characteristics. For example, the rate of dissolution of the antimicrobial material can be affected by the temperature of the water as well as the salinity of the water. Because of the potential interrelationship of the various water characteristics the control system described herein provides for automatically maintaining a number of water characteristics within suitable ranges without intervention by the user. The control system is well suited for use with dispensing materials such as a mineral dispenser sold by King Technology of Hopkins Minn.

FIG. 2 shows a partial cut away view of an inline automated on-the-go control system 15 that includes both a water characteristic monitoring unit 16 and a dispensing unit 31 that can be attached to the circulation system of FIG. 1. FIG. 3 shows how the on-the-go control system 15 can be mounted in the outlet pipe 14 of the water circulation system of FIG. 1 to provide both on/off control as well as proportional control of water through the dispenser cartridges 35 and 36.

The control system 15 is suitable for attachment to the water system 10 during manufacture of the water system or as an after market item. Briefly, control system 15 includes a monitor unit 16 that has a first end which is secured to an outlet pipe 14 and a second end secured to pipe 34. Located in monitor unit 16 and upstream of the dispensers 35 and 36 are a set of four different water comfort and water safety sensors 17, 18, 19 and 20. For example, the sensors could be a salinity sensor, a pH sensor, a temperature sensor and a microorganism sensor. Sensor 17 connects to control station 25 through a lead 17a. Similarly, sensor 28 connect to control station 25 through a lead 18a, a sensor 19 connects to control station 25 through a lead 19a and sensor 20 connects to control station 25 through a lead 20a. Sensors, for measuring the above water characteristics are known in the art and are not described herein. While four sensors are shown in monitor unit 16 more or less sensors could be used depending on the number of water characteristics that need to be monitored.

As water flows past the sensors the control station 25 receives the on-the-go signals from the sensors 17, 18, 19, and 20. The control system which can be a processor and hardware that develops a control signal based on the measurements of the sensors and reference levels in the processor. The control system 25 has an output lead 26 that connects to a valve 27 that contains a diverter plate 28. The control signal operates a motor, not shown, that rotates diverter plate 28 into a position to either partially or completely block off one or the other of branch pipes 30 and 33, thus providing analog or proportional control of the water flow or if flow is blocked off completely an on off control of fluid flow therethrough.

Pipe 30 connects to an inlet side of housing 31, which has a removable cover 32 therein with a first dispenser 35 and a second dispenser 36 located in housing 31. Dispenser 35 and 36 are of the type where the flow area through the dispenser can be increased or decreased by opening and closing ports in the dispenser to limit the flow through the dispenser and thereby control the release of dispersant from the dispenser. An example of such a dispenser where the flow area can be changed is shown in U.S. Pat. No. 7,059,540 and is hereby incorporated by reference. Thus with the present invention each of the flow through areas in the two dispensers 35 and 36 can be selected to obtain a desired dissolution rate or dissemination rate for the material contained within the dispenser. Thus, in the embodiment shown at least two dispensers 35 and 36 are used wherein at least one or both of the dispensers one can change the amount of water flowing through the dispenser by controlling the port size in the dispensers. Thus materials, which are dissolved at different rates, can be placed side by side in the single fluid stream flowing through the housing 31. A return pipe 37 connects to an outlet side of housing 31 and joins with branch pipe 33, which connects to return pipe 14. A second branch pipe 33, which is located in a parallel condition but contains no housing for cartridges, also connects to pipe 14.

In operation of the control system 15 of FIG. 2 water enters pipe 14 and flows past the sensors 17, 18, 19, and 20. In response to the water characteristics the sensors send a signal to the control station 25, which generates a control signal that controls the rotational position of diverter plate 28 in control valve 27. By controlling the position of diverter plate 28 one can direct more or less water through the dispenser housing 31 to thereby provide for on-the-go adjustment of the water characteristics without shutting off the flow of water past the sensors in the monitoring unit. For example, if sensor 17 indicates the level of water borne microorganisms, such as bacteria, is to high one needs to direct more water through the pipe 30 and through the dispenser 35 in the housing 11 in order to raise the level of antibacterial material in the water. If the dispensers in the dispenser housing 31 contains dispensers with minerals or other ion yielding materials one can increase the water flow through dispenser housing 31 to increase the concentration of metal ions such as the silver ion in the water. A feature of the invention is that the condition of bacteria in the water can be monitored continually by sensor 17. Once the bacteria in the container 10 reaches the proper level the control station 25 generates a signal to rotate valve 28 in a clockwise direction to direct the stream of water partially into pipe 30 and partially into bypass pipe 33. Consequently, the water flowing through bypass pipe 33 bypasses the dispenser 35 and dispenser 36 in housing 31. With the decrease in flow though housing 31 and the dispensers 35 and 36 the level of material dispensed into the water decreases. At the same time the volume of circulation of the water in the container can be maintained since the water is diverted from one branch pipe 30 to the other branch pipe 33 or vice versa. That is the rate of water flowing through the pump 13 and back into the container 10 can be maintained with while the water comfort characteristics and the water safety characteristics can be adjusted on-the-go by smoothly directing more or less water through the dispensers holding the dispensable materials. While the water characteristics can be controlled without maintaining a continuous flow the use of this feature allows one to use an existing water circulation system without impacting the circulation of the system. Thus a feature of the invention shown in FIG. 2 is a system with a bypass pipe 33 and a branch pipe 30 with a housing 31 for retaining the dispensers 35 and 36 therein and a diverter valve 27 having a diverter 28 for directing water through either the branch pipe or simultaneously thorough both the bypass pipe or the branch pipe to provide simultaneous control of four sensed parameters with only two dispensers.

FIG. 4 shows an alternate embodiment of the control system 75 that can be fitted into the circulation system shown in FIG. 1. The control system 75 is similar to the control system 15 and includes an inlet pipe 14 that connects to a monitor unit 46 that includes a control station 45 that connects to a diverting chamber 50 containing a set of rotatable valves which are identical to the rotatable valve 28 shown in FIG. 2. A pipe 48 connects to monitor 46 to receive the water that flows though monitor unit 46 and direct the water into housing 50. Housing 50 includes four outlet pipes 55, 56, 57 and 58 that are located in parallel to each other. Outlet pipe 55 directs water though housing 60 and pipe 65 directs the water into plenum chamber 68. Outlet pipe 61 direct water into housing 61 and pipe 66 directs the water into plenum chamber 68 and similarly outlet pipe 57 directs water to housing 62 and pipe 67 directs the water into plenum chamber 68. A fourth outlet pipe 58 connects housing 50 directly to a plenum chamber 68. Plenum chamber 68 receives the water from the various pipes and directs the water into the return pipe 14. As can be seen in FIG. 4 the water discharging from housing 50 includes four separate flow paths, one of which is a by pass and the other three contain dispensers that can separately dispense material into a fluid stream and then can combine the fluid streams with each other so that the dispersant can be mixed before being sent into the body of water to be conditioned.

The housing 50 includes multiple control valves with each of the control valves positioned to open or partially close the amount of water flowing into the respective pipes 55, 56, 57 or 58.

The system of FIG. 4 differs from the system of FIG. 3 in that the housing 60 contains a single material that can affect a water characteristic. Thus, the control of the water and safety characteristics can be made independent of each other. That is, the flow through dispenser housing 60 can be shut off without affecting the flow to dispenser housing 61 or 62. Similarly, the dispenser housings 60, 61 and 62 can be shut off and fluid allowed to flow through bypass pipe 58 and back into the outlet pipe 14. In each system the water characteristics can be monitored on-the-go and the signals developed can be used to increase, decrease or maintain the flow through one or more pipes in order to maintain the water characteristics within a suitable range.

FIG. 5 shows a cutaway view of a proportional or analog control system 100 that can be coupled into an existing fluid circulation system as an after market device or, if desired, can be included in the manufacture of a water container and fluid circulation system. It is believed that the on/off type of controls for water systems wherein the control system intermittently stops the dispensing when a measured water characteristic exceeds a specified range may be unsuitable under certain conditions. Generally, in on/off systems the dispensers in the system dispense when the measured water characteristic is below a certain level which can produces abrupt increases in the delivery of dispensing material to the body of water. Conversely, when the measured water characteristic is below a above a predetermined level the dispenser is such off. It is believed that such delivery can produce delays in maintaining the water characteristics at the proper level. In addition, if two or more water characteristics are measured and controlled it is believed it can make it difficult to maintain the proper water characteristics in the container since the level of one water characteristic can affect the effectiveness of another water characteristics. When the container is a smaller body of water such as found in home pools or spas it can result in delays in bringing the water characteristics to the proper level.

Figure 6:
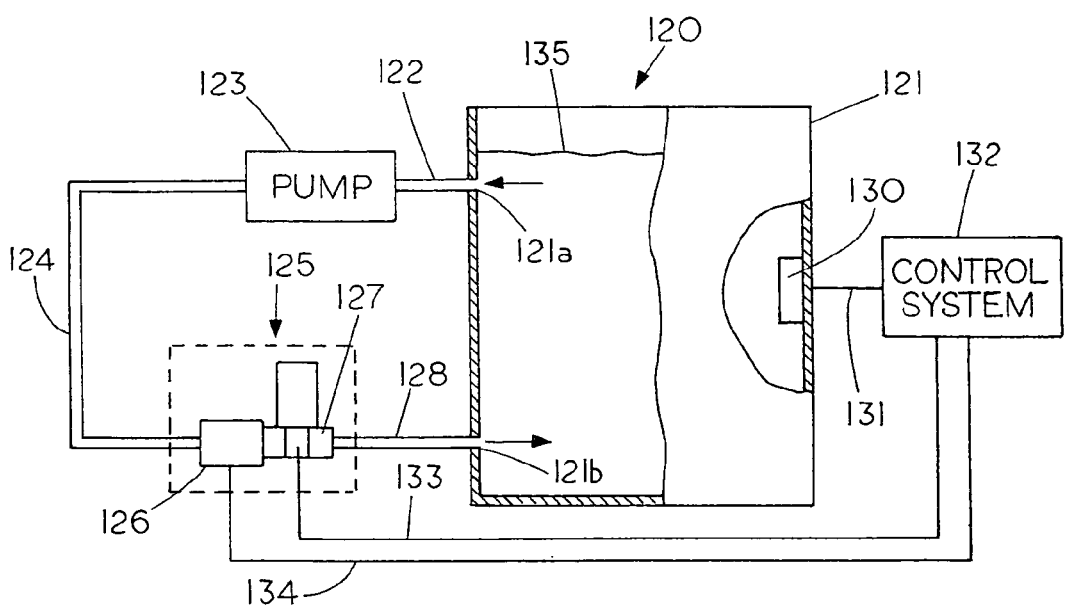
FIG. 6 shows an alternate embodiment of the analog system of FIG. 6 wherein the dispensing units have been spliced into an existing circulation line.

The control system of FIG. 5 and FIG. 6 provide an analog control system that instead of abruptly turning the system on and off can smoothly changes the dispensing rates to maintain the proper water characteristics. Since the analog rate of dispensing material is changes smoothly it can eliminate a local region in the body of water where the water characteristics may be extremely high because a dispensing material has been rapidly added to the water to bring the water characteristics of the entire body of water to the proper level. However, if desired the system can be operated in an on off manner enabling an operator to have the benefit of an analog or proportional system as well as an on off system.

The system of FIG. 5 shows an analog control system 100 with a container 101 having a body of fluid, such as water 102, therein and a conventional fluid circulation system 99 with water characteristic sensors 104 and dispensers 107 and 109 connected to the circulation system 99. More specifically, the fluid circulation system 99 includes a container outlet 101a connected to a water pump 106 that draws water therein through conduit 103, water characteristic sensors 104 and conduit 105. The circulation system pump 106 then directs the water through a chlorine or salt generator 107, which can generate chlorine ions, a conduit 108 and an inline dispersal valve 109, which can releases an antibacterial material such as silver ion, and a conduit 110 that connects to container inlet 101b to bring the water back to the container 101.

A feature of the system of FIG. 5 is that both the chlorine generator 107 and the inline dispersal valve 109 can be spliced into a circulation line 99 of an existing system 100. In addition, the water characteristic sensors 104, which can measure one or more water characteristics is also shown spliced into the circulation line; however, if desired, the sensors 104 could also be mounted in the container 101 to monitor the water characteristics in the container rather than in the incoming water in the fluid circulation system.

In operation of the system of FIG. 5 a water characteristic is measured by sensors 104, for example sensors 104 can monitor the chlorine level in water 102. In response to the level of chlorine in the water a signal is sent to control 110 which in turn can change the voltage supplied to chlorine generator 107. By changing the output of the voltage source 111 that powers chlorine generator 107 one can change the chlorine output and by increasing or decreasing the voltage without shutting off the voltage one can smoothly and gradually change the chlorine output to avoid local regions of high chlorine concentrations. Thus, by changing the voltage to the chlorine generator 107 one can allow the fluid to be continuously circulated i.e. without interruption, through the chorine generator 107. That is, if the chlorine ion sensor in water characteristics sensor 104 detects the chlorine level is deviating from the desired level the voltage to the chlorine generator can be increased to increase the release of chlorine ions or if the chlorine level is becoming to high the voltage to the salt generator can be decreased thus reducing the chlorine output. In either case the use of a continuously varying voltage to the chlorine generator allows one to closely control the release of chlorine ions into the water without having to change the flow of water through chlorine generator where the chlorine generator is turned on and off for the sole purpose of control of a dispersant. Thus, a feature of the invention is to provide an analog system that can continually and smoothly control the output of the chlorine generator without the need for periodic manual adjustment. Devices wherein the voltage of a chlorine generator is manually selected to control the dispensing of chlorine items manufactured and sold by American SPS of Altamonte Springs, Fla.

System 100 also includes a dispensing valve 109 wherein a dispersant is placed in the dispensing valve and a portion of the water flowing through the valve is directed through a chamber in the dispensing valve to deliver the dispersant therein to the body of water. A dispensing valve wherein the setting on the valve is manually adjusted is maneuvered and sold by King Technology of Hopkins Minn. and is more fully described in U.S. Pat. No. 6,544,415

In the system 100 the dispensing valve 109 has been automated by connecting the rotatable handle 109a to an extendible ram 113 of a two-way hydraulic cylinder 112. The other end of hydraulic cylinder 112 is pivotally mounted on support 114. A hydraulic source 115 has one line 115a connected to one side of the two way hydraulic cylinder and a second line 115b to the other side of the two-way hydraulic cylinder to provide analog control of the rotatable valve through extension and contraction of extendible ram 113. The hydraulic source 115 is connected to control 110 by lead 117.

In operation of the system the control 110, which can be a processor, receives a signal from the water characteristic sensor 104 and in response thereto sends a signal to the hydraulic source 115 to either rotate or maintain the rotatable handle 109*a* in the same position. For example, if the water sensor 104 detects that the level of metal ions is to low more metal ions can be dispensed into the fluid line by sending a signal to hydraulic source 115 that will proportional extend ram 113 to thereby rotate valve handle 109*a* to increase the rate of dispensing of metal ions into the fluid. Since the rate of dispersant can be changed without having to shut down the dispensing unit one can smoothly adjust the deliver of the dispensing material from the dispensing unit 109.

Thus, a feature of the system 100 of FIG. 5 is that an existing manually adjustable system, which is manually adjusted to increase or decrease the release of antibacterial material, can be adapted to use with the control 110 to provide for continuous on-the-go control of the water characteristics thus ensuring that the water characteristics are maintained as closely as possible to the proper safety and comfort levels without having to abruptly shut off the dispensing units thus minimizing effects of one water characteristic on another water characteristic.

FIG. 6 shows an alternate embodiment of a control system 120 when a container 121 includes a circulation system that has a pump 123 that takes water at inlet 121*a*, drawing it through conduit 122 and directs it through conduit 124 and into dispensing unit that has been spliced into return line 128 which delivers the circulation fluid to the container through outlet 121*b*. In the system of FIG. 6 the water characteristic sensors 130 are mounted in the body of water and the measured level of water characteristic is sent via lead 131 to control system 132, which in turn, sends a control signal to chlorine generator 126 through lead 134 and to dispensing valve 127 through lead 133. The signal delivered to chlorine generator 126 and to dispenser valve 127 are analog so that the deliver of material can be changed without having to shut down the deliver of dispersant into the water. A feature of the system of FIG. 6 is that the dispenser can be spliced directly into a circulation line of an existing system.

While the analog control system has been shown for use with a chlorine generator and a dispersal valve that delivers metal ions the control system can be used to smoothly control other water characteristics of the body of water. For example, the pH of the body of water is another water characteristics that can benefit from an analog control of the pH. Thus the system is shown using the control signal to increase, decrease or maintain the flow as well as other water characteristics.

Thus the systems of the present invention provide low cost easy to use systems that are consumer friendly and can be used in an in home spa or swimming pool or the like.

I claim:

1. A recreational water circulation system for controlling water characteristics comprising:
    a container for holding a body of recreational water;
    a circulation line connected to said container;
    a pump, said pump circulating water to and from the container through said circulation line;
    a dispenser in fluid communication with the body of recreational water, said dispenser containing a dispensable material including an ion yielding material for changing a water characteristic of the body of recreational water;
    a chlorine generator for releasing chlorine into the body of recreational water for changing the water characteristic of the body of recreational water;
    a plurality of sensors located in either said circulation line or said container for on-the-go measuring the water characteristic of the body of water upstream of the chlorine generator wherein a volume of water flowing past the sensors remains constant while a volume of water flowing past the dispenser changes in response to a measurement from said sensors; and
    a control station responsive to the measured water characteristic from said sensor with said control system directing more or less water through the dispenser while generating chlorine in the circulation line to thereby maintain the chlorine in the container within a suitable range by increasing or decreasing an amount of dispensable material while controlling the generation of chlorine in the water in the circulation line.

2. The system of claim 1 wherein the dispensable material includes minerals and the water characteristic of the body of water is the level of chlorine in the body of water.

3. The system of claim 2 wherein the dispensable material includes silver chloride.

4. The system of claim 3 including at least two dispensers wherein at least one of the dispensers is flow area controllable.

5. The system of claim 1 wherein the circulation line includes a bypass pipe and a branch pipe with a housing therein for retaining at least two dispensers therein and a diverter valve for directing water through either the branch pipe or simultaneously through both the bypass pipe or the branch pipe before returning the water to the container.

6. The system of claim 3 including a diverter for directing water into either a bypass pipe or a branch pipe containing a dispenser housing.

7. The system of claim 1 wherein the sensor is mounted in a monitoring unit that is mounted upstream of the dispenser.

8. The system of claim 1 including at least two sensors and a pump for directing water past said at least two sensors.

9. The system of claim 8 wherein one of the sensors is a salinity sensor.

10. The system of claim 8 wherein one of the sensors is a pH sensor.

11. The system of claim 8 wherein one of the sensors is a microorganism sensor.

12. The system of claim 8 wherein one of sensors is a temperature sensor.

13. A method of continually controlling a level of a safety or comfort characteristic of a body of water without intermittently interrupting the operation of the system comprising:
    recirculating a portion of water in a container through a water circulation line;
    measuring a water characteristic of a body of water;
    generating a control signal in response to the measured water characteristic of the body of water; and
    using the control signal to increase or decrease the voltage to a chlorine generator located in the circulation line and to increase or decrease the water flow through a dispensing unit in the water circulation line to thereby increase or decrease a rate of dispensing from the dispensing unit in order maintain the water characteristic in the container at a proper level.

14. The method of claim 13 wherein the measuring of the water characteristic is done on-the-go and including a comparison of the water characteristic is done on-the-go.

15. The method of claim 14 wherein to change the characteristic of the water more or less water is flowed through a dispenser housing ranging from no flow to full flow.

16. The method of claim 15 wherein at least two characteristics of the water are measured as the water flows through a monitor.

17. The method of claim 14 wherein the measuring is done at one location and the changing of the characteristic of the water is done downstream of the one location.

18. The method of claim 14 including pumping water through both a bypass pipe and a branch pipe to enable water circulation to be maintained even though water flow through a dispenser housing in the branch pipe is changed.

19. The method of claim 14 wherein the water is directed through a swimming pool, spa or hot tub.

20. The method of claim 14 wherein the water is directed through a dispenser containing minerals.

21. A system for controlling water characteristics in an in home swimming pool or spa comprising:
    a chlorine sensor for on-the-go measuring a level of chlorine in a first portion of a body of water to obtain a measured chlorine level;
    a flow area controllable dispenser containing an ion yielding material; and
    a control station responsive to the measured chlorine level in the first portion of, the body of water, said control station changing a chlorine level in a second portion of the body of water in response to the measured chlorine level by varying a voltage to a chlorine generator in order to maintain a proper chlorine level for the body of water.

22. The system of claim 21 wherein the flow area controllable dispenser includes minerals.

23. The system of claim 22 wherein the dispenser includes silver chloride.

24. A control system for controlling water characteristics of a body of recreational water comprising:
    a container for holding a body of recreational water;
    a circulation line connected to said container;
    a pump, said pump circulating water to and from the container through said circulation line;
    a plurality of branch lines located in said circulation line for directing a portion of the water therethrough;
    a sensor for measuring a water characteristic;
    a control station for generating a signal in response to the water characteristic; and
    a first dispenser housing located in one of said plurality of branch lines and a second dispenser housing located in another of said plurality of branch lines, said dispenser housings independently responsive to thereby change a dispensing rate of the dispenser housing in one of the plurality of branch lines and a bypass line.

25. The control station of claim 24 wherein the first dispenser is a chlorine generator and the signal is an analog voltage signal; and a plenum chamber for mixing the water from the plurality of branch lines before directing the water back into the body of recreational water.

26. The control station of claim 25 wherein the second dispenser is a mineral dispenser and the signal is a hydraulic signal that rotates a selector valve in the mineral dispenser to direct water.

27. The control station of claim 25 wherein at least two water characteristics are measured and the at least two water characteristics are simultaneously controlled by the control station.

28. The control station of claim 25 wherein the water characteristic sensors are mounted in the body of water.

29. The control station of claim 25 including a plenum chamber wherein the flow of water passes through the plenum chamber before returning to the container.

\* \* \* \* \*